(12) United States Patent
Oota

(10) Patent No.: US 7,111,607 B2
(45) Date of Patent: Sep. 26, 2006

(54) AIR INTAKE DEVICE OF INTERNAL COMBUSTION ENGINE

(75) Inventor: Hajime Oota, Yokohama (JP)

(73) Assignees: Nissan Motor Co., Ltd., Yokohama (JP); Renault SA, Boulogne Bilancourt Cedex (FR)

( * ) Notice: Subject to any disclaimer, the term of this patent is extended or adjusted under 35 U.S.C. 154(b) by 206 days.

(21) Appl. No.: 10/351,398

(22) Filed: Jan. 27, 2003

(65) Prior Publication Data

US 2003/0150431 A1 Aug. 14, 2003

(30) Foreign Application Priority Data

Feb. 13, 2002 (JP) ........................ 2002-034846

(51) Int. Cl.
*F02B 31/00* (2006.01)

(52) U.S. Cl. .............. 123/308; 123/184.14; 123/184.25

(58) Field of Classification Search ................ 123/308, 123/188.14, 432, 301, 306, 184.25, 184.26, 123/184.27, 184.37
See application file for complete search history.

(56) References Cited

U.S. PATENT DOCUMENTS

| | | | | | |
|---|---|---|---|---|---|
| 4,766,866 A | * | 8/1988 | Takii et al. | ................... | 123/432 |
| 5,273,014 A | * | 12/1993 | Mitobe et al. | ............... | 123/336 |
| 5,522,360 A | * | 6/1996 | Suzuki et al. | ................ | 123/329 |
| 5,718,198 A | * | 2/1998 | Adamisin et al. | ............ | 123/308 |
| 5,852,994 A | * | 12/1998 | Tsuzuku et al. | ............. | 123/308 |
| 5,915,354 A | * | 6/1999 | Ma | .............................. | 123/308 |
| 6,148,794 A | * | 11/2000 | Tsuzuku et al. | .......... | 123/406.5 |

FOREIGN PATENT DOCUMENTS

JP 2001-193469 A 7/2001

* cited by examiner

*Primary Examiner*—John T. Kwon
(74) *Attorney, Agent, or Firm*—Foley & Lardner LLP

(57) ABSTRACT

An air intake device of an internal combustion engine comprises a cylinder head having therein two intake ports that are adapted to connect to a cylinder of a cylinder block; and a single partition plate that extends across both the two intake ports so that each of the two intake ports is divided into first and second air passages.

7 Claims, 3 Drawing Sheets

AIR INTAKE DEVICE OF INTERNAL COMBUSTION ENGINE

BACKGROUND OF INVENTION

1. Field of Invention

The present invention relates in general to air intake devices of internal combustion engines, and more particularly to the air intake devices of a type that has two intake ports for each cylinder of a cylinder block of the internal combustion engine.

2. Description of Related Art

Laid-open Japanese Patent Application (Tokkai) 2001-193469 shows an air intake device of the above-mentioned type that is constructed to strengthen a tumbling air flow led to the cylinders of the engine. That is, in the air intake device disclosed by the publication, an elongate partition plate is installed in each intake port in a manner to extend along an axis of the intake port defining upper and lower parallel passages therein. The partition plates are integrally installed in the cylinder head upon casting of the cylinder head. Each partition plate has side edges embedded in a cylindrical wall of the intake port.

SUMMARY OF INVENTION

However, due to its inherent construction, the air intake device of the publication fails to have a satisfied stoutness with which the partition plate is fixed to the cylinder head. Furthermore, when the measures of the publication are applied to neighboring two intake ports, a difficulty arises in positioning the respective partition plates to the two intake ports. That is, if the two partition plates are arranged to lie on the same imaginary plane, a certain but not small distance should be provided between the two intake ports, which would bring about a bulky construction of the intake device.

It is therefore an object of the present invention to provide an air intake device of an internal combustion engine, which is free of the above-mentioned drawbacks.

According to a first aspect of the present invention, there is provided an air intake device of an internal combustion engine, which comprises a cylinder head having therein two intake ports that are adapted to connect to a cylinder of a cylinder block; and a single partition plate that extends across both the two intake ports so that each of the two intake ports is divided into first and second air passages.

According to a second aspect of the present invention, there is provided an air intake device an internal combustion engine, which comprises a cylinder head having therein two intake portions that are adapted to connect to a cylinder of a cylinder block and two exhaust ports that are adapted to connect to the cylinder; and a single partition plate that extends across both the two intake ports so that each of the two intake ports is divided into upper and lower air passages.

DETAILED DESCRIPTION OF EMBODIMENTS

In the following, air intake devices embodying the present invention will be described in detail with reference to the accompanying drawings.

Figure 1:
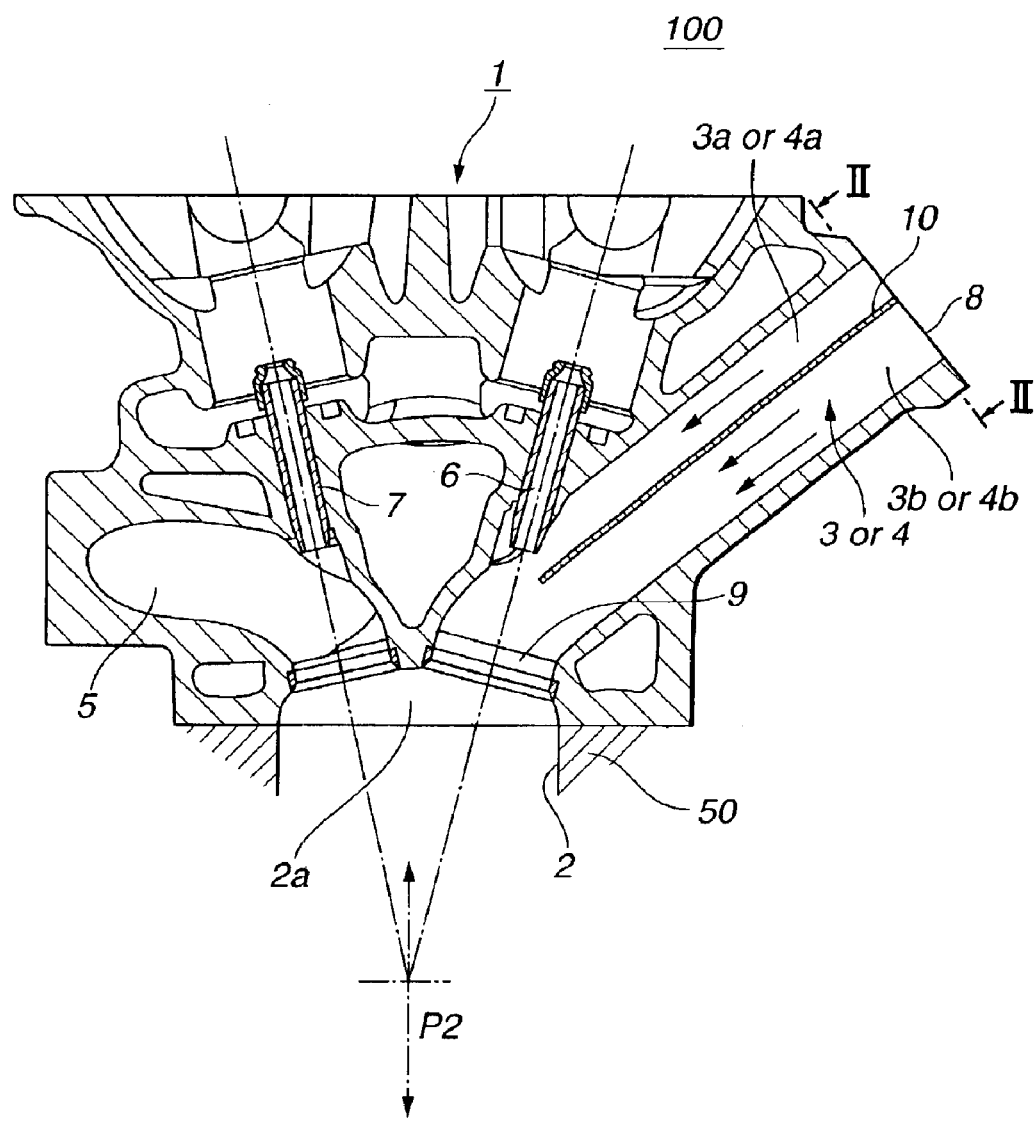
FIG. 1 is a sectional view of a cylinder head of an internal combustion engine, which is an air intake device of a first embodiment of the present invention.

Referring to FIG. 1, there is shown in a sectional manner a cylinder head 1 which is an air intake device 100 of a first embodiment of the present invention. A sectional view taken along the line II—II of FIG. 1 is shown in FIG. 2.

Cylinder head 1 is cast from an aluminum alloy or the like.

Figure 2:
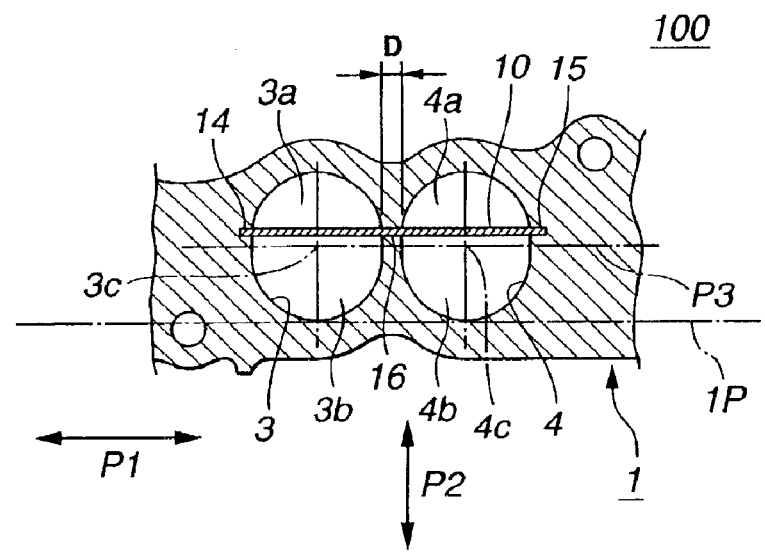
FIG. 2 is a sectional view taken along the line II—II of FIG. 1.

As is seen from FIGS. 1 and 2, cylinder head 1 is formed with two, that is, first and second intake ports 3 and 4 for each cylinder 2 of a cylinder block 50. Furthermore, cylinder head 1 is formed with two exhaust ports 5 for each cylinder 2. Each of intake and exhaust ports 3, 4 and 5 is provided with an intake or exhaust valve (not shown) that is movably held by a valve guide 6 or 7 installed in cylinder head 1. That is, when pushed down, each intake or exhaust valve opens the corresponding intake or exhaust opening exposed to a combustion chamber 2a defined by cylinder 2 above a piston (not shown).

As is seen from FIG. 2, two intake ports 3 and 4 are arranged to extend abreast with respect to a direction "P1" of the axis of a crankshaft (not shown) keeping a certain small distance "D" therebetween. That is, two intake ports 3 and 4 are put on an imaginary plane "IP" that extends in parallel with the axis of the crankshaft.

As is seen from FIG. 1, two intake ports 3 and 4 extend in parallel with each other from upstream ends 8 thereof to which an intake manifold (not shown) is connected to downstream ends 9 thereof which are exposed to combustion chamber 2a. It is to be noted that the parallel arrangement of two intake ports 3 and 4 may be not so accurate.

As is seen from FIG. 2, a single partition plate 10 of metal extends across both two intake ports 3 and 4 in such a manner that each intake port 3 or 4 is divided into an upper passage 3a or 4a and a lower passage 3b or 4b by the plate 10. As is seen from FIG. 1, partition plate 10 extends from upstream ends 8 of two intake ports 3 and 4 to a position near downstream ends 9 of the same.

That is, as is seen from FIGS. 1 and 2, with provision of partition plate 10, first or second intake port 3 or 4 is divided into an upper passage 3a or 4a and a lower passage 3b or 4b which are arranged at upper and lower portions with respect to a direction "P2" of an axis of the corresponding cylinder 2.

Although not shown in the drawings, at upstream portions of two intake ports 3 and 4, there is arranged a tumbling air flow control valve (not shown) that selectively opens and closes lower passages 3b and 4b. By closing lower passages 3b and 4b by the tumbling air flow control valve thereby causing only upper passages 3a and 4a of two intake ports 3 and 4 to open, the tumbling effect applied to intake air led to the cylinder 2 is increased or strengthened. With this, a higher fuel efficiency is expected by the engine.

As is seen from FIG. 2, in this first embodiment, each of first and second intake ports 3 and 4 is oval in cross section with its long axis extending in the direction "P2" of the axis of the corresponding cylinder 2. Furthermore, in this first embodiment, partition plate 10 is located just above an imaginary plane "P3" that includes a center axis 3c of first intake port 3 and a center axis 4c of second intake port 4, so that upper passage 3a or 4a has a smaller sectional area than lower passage 3b or 4b. That is, partition plate 10 is poisoned nearer to upper passages 3a and 4a than lower passages 3b and 4b, as shown.

In order to produce the above-mentioned cylinder head 1 to which the first embodiment of the present invention is applied, the following casting method is employed.

Figure 3:
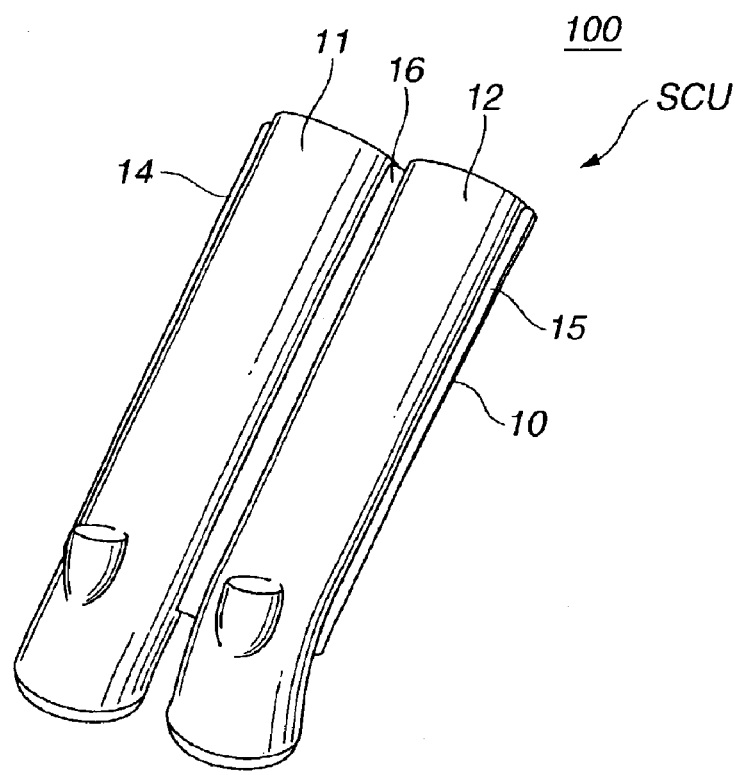
FIG. 3 is a perspective view of a sand core unit with a partition plate, that is used when casting the cylinder head.

That is, as is shown in FIG. 3, a sand core unit "SCU" having a partition plate 10 embedded therein is prepared. That is, the sand core unit "SCU" comprises first and second sand cores 11 and 12 that are shaped to correspond to first and second intake ports 3 and 4, and partition plate 10 that has laterally opposed side portions embedded in first and second sand cores 11 and 12. Partition plate 10 may be constructed of duralumin having a thickness of about 1 to 2 mm. As shown, partition plate 10 held by sand cores 11 and 12 has opposed lateral edge parts 14 and 15 and a center narrow part 16 which are exposed to the outside. As is seen from FIG. 2, upon completion of casting, these exposed parts 14, 15 and 16 are embedded in the cast aluminum alloy of the cylinder head 1 produced.

For practically casting cylinder head 1, given numbers of sand core units "SCU" are set in given positions in a sand mold, and a melted aluminum alloy is poured into cavities of the sand mold. After the aluminum alloy is cooled and thus hardened, the sand mold is broken to expose the product, viz., the cylinder head 1.

In the following, advantages of the air intake device 100 with respect to the known air intake device disclosed by the above-mentioned Japanese publication will be described.

First, as is seen from FIG. 2, partition plate 10 is supported in cylinder head 1 through three supporting areas of partition plate 10, which are one lateral edge part 14, the other lateral edge part 15 and center narrow part 16. As is understood from the drawing, the center narrow part 16 is steadily embedded in a partition wall of cylinder head 1 by which two intake ports 3 and 4 are separated. This means that the single partition plate 10 is much tightly held by cylinder head 1 as compared with the above-mentioned known case wherein the two partition plates are respectively installed in two intake ports 3 and 4. Furthermore, for the same reason, the distance "D" can be much reduced, which induces a compact construction of the air intake device 100.

Second, upper and lower passages 3a and 3b of first intake port 3 and those 4a and 4b of second intake port 4 are can be defined by only one partition plate 10. This means reduction in number of parts used and simplification of manufacturing cylinder head 1. Furthermore, for the same reason, freedom in layout of partition plate 10 in cylinder head 1 is increased.

Figure 4:
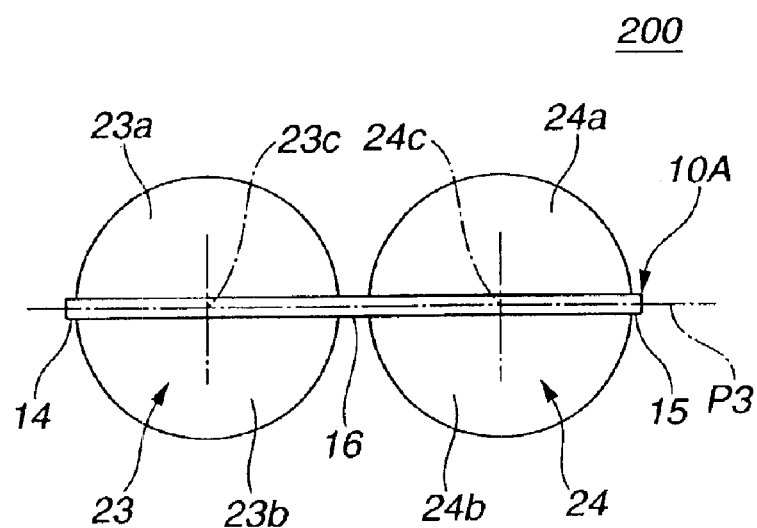
FIG. 4 is a sectional view similar to FIG. 2, but showing a second embodiment of the present invention.

Referring to FIG. 4, there is shown a sectional view similar to FIG. 2, but showing an air intake device 200 of a second embodiment of the present invention.

In this embodiment 200, each of first and second intake ports 23 and 24 has a circular cross section. Furthermore, a partition plate 10A used extends in and along the imaginary plane "P3" that includes a center axis 23c of first intake port 23 and a center axis 24c of second intake port 24. Thus, in this embodiment 200, upper and lower passages 23a and 23b of first intake port 23 have the same sectional area and those 24a and 24b of second intake port 24 have the same sectional area.

Figure 5:
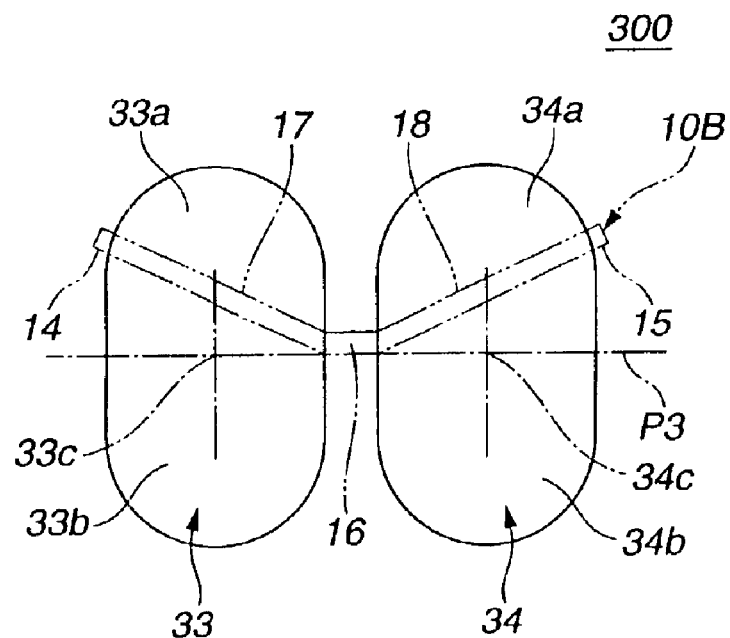
FIG. 5 is a sectional view also similar to FIG. 2, but showing a third embodiment of the present invention.

Referring to FIG. 5, there is shown a sectional view similar to FIG. 2 also, but showing an air intake device 300 of a third embodiment of the present invention.

In this embodiment 300, similar to the above-mentioned first embodiment 100, first and second intake ports 33 and 34 have each an oval cross section. In addition, as shown, a partition plate 10B used is bent at its center narrow part 16 to have a generally V-shaped cross section. That is, the center narrow part 16 of partition plate 10B is located on the imaginary plane "P3" that includes a center axis 33c of first intake port 33 and a center axis 34c of second intake port 34. Furthermore, as shown, laterally opposed portions 17 and 18 of partition plate 10B are inclined relative to the imaginary plane "P3". That is, the portions 17 and 18 are inclined toward upper passages 33a and 34a respectively, so that upper passages 33a and 34a have each a smaller sectional area than lower passages 33b and 34b, like in the above-mentioned first embodiment 100.

The entire contents of Japanese Patent Application 2002-34846 (filed Feb. 13, 2002) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An intake device of an internal combustion engine, comprising:
    a cylinder head having therein two intake ports that are adapted to connect to a cylinder of a cylinder block of the engine; and
    a single partition plate secured to the cylinder head and exposed to interior of both the two intake ports, the single partition plate extending in and along each of the two intake ports so that each of the two intake ports is divided into first and second axially extending air passages.

2. The intake device as claimed in claim 1, in which the partition plate extends on a plane that is spaced away from an imaginary plane that includes center axes of the two intake ports.

3. The intake device as claimed in claim 1, in which the partition plate is bent to have a V-shaped cross section, so that portions of the partition plate that are respectively exposed to the two intake ports are inclined relative to an imaginary plane that includes center axes of the two intake ports.

4. The intake device as claimed in claim 1, in which the two intake ports have each one of oval and circular cross sections.

5. The intake device as claimed in claim 1, in which the partition plate is integrally installed in the cylinder head upon casting of the cylinder head.

6. The intake device as claimed in claim 1, in which the partition plate has a thickness of approximately 1 mm to approximately 2 mm.

7. An air intake device of an internal combustion engine, comprising:
    a cylinder head having therein two intake ports that are adapted to connect to a cylinder of a cylinder block and two exhaust ports that are adapted to connect to the cylinder; and
    a single partition plate that extends across both the two intake ports so that each of the two intake ports is divided into upper and lower air passages.

* * * * *